(12) United States Patent
Zhou

(10) Patent No.: US 10,298,791 B2
(45) Date of Patent: May 21, 2019

(54) USING TRANSIENT RESPONSES TO DETERMINE CHARACTERISTICS OF CONTROL PANEL CONNECTIONS

(71) Applicant: HEWLETT-PACKARD DEVELOPMENT COMPANY, L.P., Houston, TX (US)

(72) Inventor: Guangyu Zhou, Shanghai (CN)

(73) Assignee: Hewlett-Packard Development Company, L. P., Spring, TX (US)

( * ) Notice: Subject to any disclaimer, the term of this patent is extended or adjusted under 35 U.S.C. 154(b) by 60 days.

(21) Appl. No.: 15/596,633

(22) Filed: May 16, 2017

(65) Prior Publication Data
US 2018/0338052 A1 Nov. 22, 2018

(51) Int. Cl.
*G06F 3/12* (2006.01)
*H04N 1/00* (2006.01)

(52) U.S. Cl.
CPC ....... *H04N 1/00509* (2013.01); *G06F 3/1203* (2013.01); *G06F 3/1236* (2013.01); *G06F 3/1254* (2013.01); *G06F 3/1284* (2013.01); *H04N 1/00384* (2013.01); *H04N 1/00411* (2013.01); *H04N 2201/0082* (2013.01)

(58) Field of Classification Search
None
See application file for complete search history.

(56) References Cited

U.S. PATENT DOCUMENTS

| 6,677,852 B1 * | 1/2004 | Landt | G06K 7/0008 235/375 |
|---|---|---|---|
| 7,433,618 B2 | 10/2008 | Bartley et al. | |
| 7,436,415 B2 * | 10/2008 | Takata | G09G 5/003 345/102 |
| 9,154,600 B2 * | 10/2015 | Seo | H04M 1/72519 |
| 2001/0011946 A1 * | 8/2001 | Horon | G08B 25/14 340/525 |
| 2003/0160519 A1 * | 8/2003 | Muldoon | G05B 17/02 307/149 |
| 2004/0075649 A1 * | 4/2004 | Peng | G06F 3/023 345/168 |
| 2007/0075126 A1 * | 4/2007 | Fu | G09G 5/006 235/375 |
| 2008/0042701 A1 * | 2/2008 | Weiss | H05K 1/0266 327/143 |

(Continued)

FOREIGN PATENT DOCUMENTS

| CN | 101710473 | 5/2010 |
|---|---|---|
| CN | 205719561 | 11/2016 |

OTHER PUBLICATIONS

PINCTRL (Pin Control) subsystem, Jul. 21, 2013, < https://www.kernel.org/doc/Documentation/pinctrl.txt > (21 pages).

*Primary Examiner* — Ted W Barnes
(74) *Attorney, Agent, or Firm* — Trop Pruner & Hu PC

(57) ABSTRACT

A technique includes driving a signal line of a control panel connector to produce a transient response, which is represented by a signal that is provided by the signal line. The technique includes using the transient response to determine a characteristic of a control panel connection. Using the transient response includes sampling the signal a plurality of times to acquire a time sequence of values of the signal; and determining the characteristic based on the time sequence of values.

15 Claims, 8 Drawing Sheets

(56) References Cited

U.S. PATENT DOCUMENTS

| | | | | |
|---|---|---|---|---|
| 2011/0175757 A1* | 7/2011 | Kil | ............... | H03M 11/20 |
| | | | | 341/26 |
| 2011/0227587 A1* | 9/2011 | Nakanishi | ......... | G01R 31/3662 |
| | | | | 324/649 |
| 2012/0110235 A1* | 5/2012 | Hsieh | ............. | G09B 5/062 |
| | | | | 710/316 |
| 2012/0154851 A1* | 6/2012 | Rothery | ............. | G06F 1/1626 |
| | | | | 358/1.15 |
| 2012/0260004 A1* | 10/2012 | Yakame | ............ | G06F 13/409 |
| | | | | 710/17 |
| 2013/0293559 A1* | 11/2013 | Liu | ............. | G06T 1/60 |
| | | | | 345/530 |
| 2014/0049525 A1* | 2/2014 | Lin | ............. | G06F 3/14 |
| | | | | 345/204 |
| 2016/0056099 A1* | 2/2016 | Kumar | ............. | H01L 21/50 |
| | | | | 361/767 |
| 2018/0067534 A1* | 3/2018 | Viviescas | ............. | H03K 17/22 |

\* cited by examiner

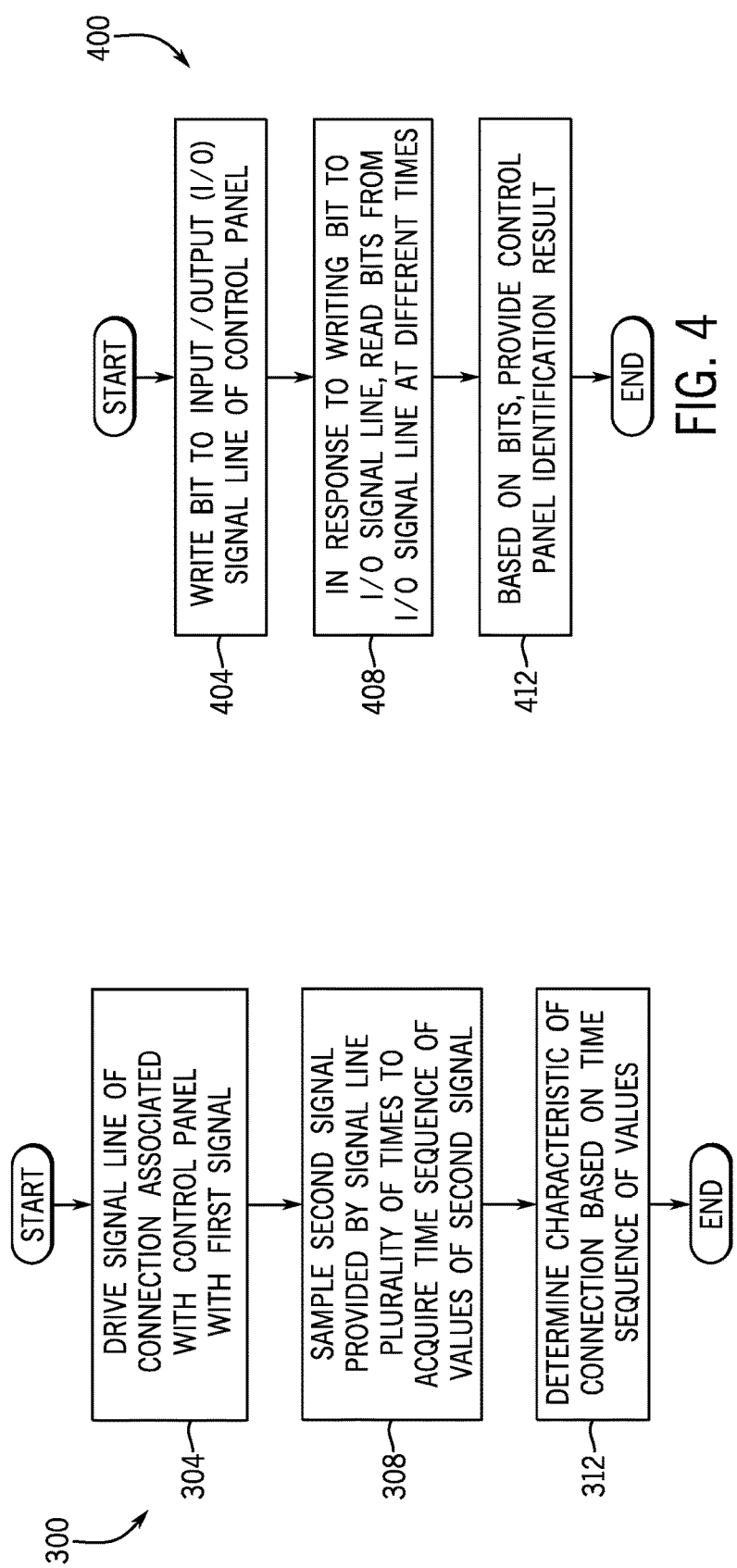

USING TRANSIENT RESPONSES TO DETERMINE CHARACTERISTICS OF CONTROL PANEL CONNECTIONS

BACKGROUND

A printer may have a control panel, which forms a user interface for the printer. The control panel may allow a user to control and set up the printer, display feedback and status information for the printer, and so forth. The control panel may have a display, which allows a user to view feedback and status information, such as network set up options, error statuses, an internet protocol (IP) address of the printer, and so forth. Moreover, the control panel may have one or multiple input devices to allow the user to enter input (input to change a network setup, select a particular menu option on a display of the control panel, input to select a particular report, and so forth). The control panel may be relatively complex and include a touch screen, and as such, the user may view feedback and status information for the printer, as well as provide input through physical interactions with the touch screen. Some control panels may be relatively less complex. For example, a control panel may include one or multiple keys, or buttons, to provide input, and in lieu of a display, the control panel may have light emitting diodes (LEDs) to display feedback and status information for the printer.

BRIEF DESCRIPTION OF THE DRAWINGS

FIG. 3 is a flow diagram depicting a technique to determine a characteristic of a control panel connection based on a transient response associated with a signal line of the connection according to an example implementation.

FIG. 4 is a flow diagram depicting a technique to identify a control panel based on a transient response associated with an input/output (I/O) signal line of the control panel according to an example implementation.

DETAILED DESCRIPTION

Figure 1:
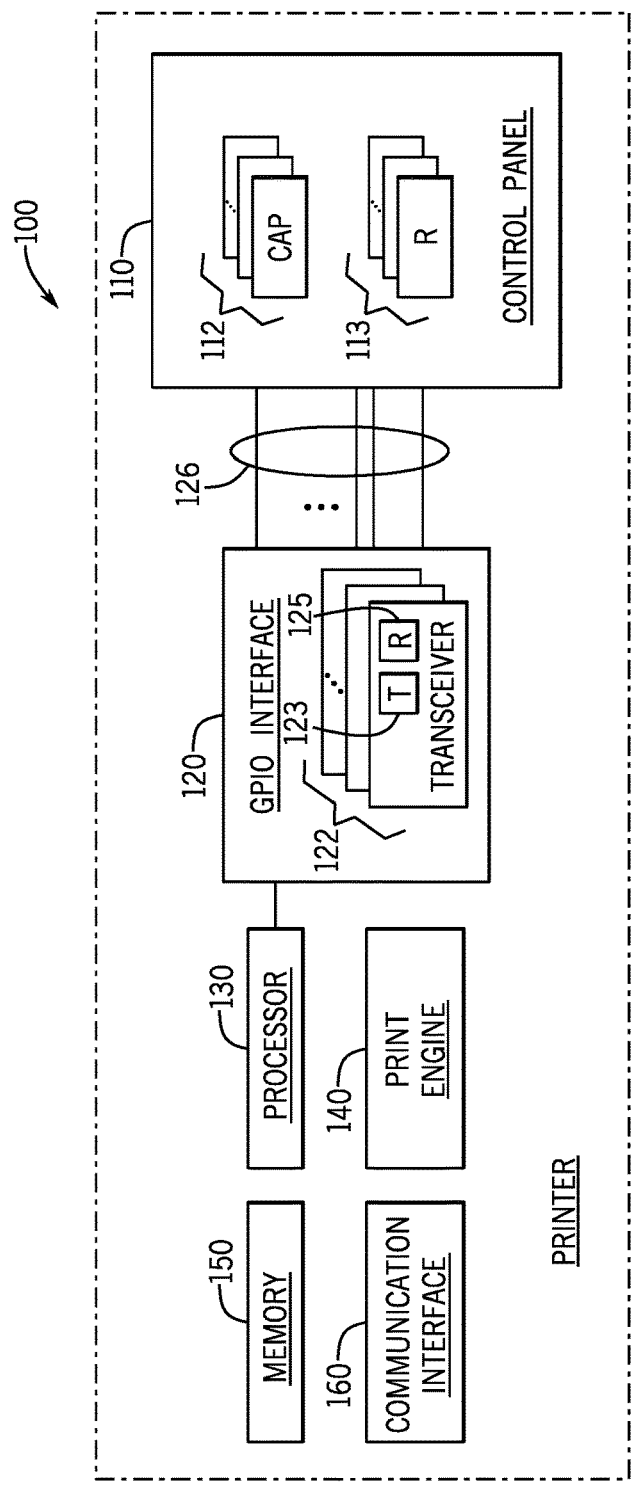
FIG. 1 is a schematic diagram of a printer according to an example implementation.

A printer manufacturer may use different control panels for different models. Moreover, the printer manufacturer may, for a given model, use similar control panels that are provided by different control panel vendors. In this context, a "control panel" refers to a unit that at least includes an input device (a contact button, a touch sensor, and so forth) to provide user input to control one or multiple printer functions. In this manner, the control panel may include one or multiple contact buttons and/or a touch screen display to provide input. The control panel may also provide output, or feedback (feedback indicating selection of a configuration option, feedback indicating a media error status, and so forth), for the user. In this manner, the control panel may have a display for providing user feedback, or in lieu of a display, the control panel may, for example, include a speaker or one or multiple light emitting diodes (LEDs) to provide audio and/or visual feedback, to the user. Thus, the control panel may be relatively simple (a control panel without a display but having push button keys and LED status lights, for example) or relatively complex (a control panel having a touch screen display, for example).

In general, a controller of the printer may communicate data to and from the control panel for purposes of receiving user input and providing user output, or feedback. In this context, a "controller" (or "printer controller") refers to one or multiple electronic components, or devices, that control, or regulate, operations of the printer. As examples, the controller may include one or multiple processing devices that execute machine executable instructions, such as one or multiple microcontrollers, one or multiple central processing units (CPUs), one or multiple CPU cores, and so forth. Moreover, a controller may include dedicated hardware that does not execute machine executable instructions, such as a field programmable gate array (FPGA), an application specific integrated circuit (ASIC), and so forth. The "operations" of the printer broadly refer to any operations that may be performed by the printer, such as operations involving receiving input from the control panel; providing output, or feedback, to a user; controlling a print engine of the printer to print images on paper or other media; communicating with a network device; communicating with a host computer; and so forth.

A given printer controller may be installed in different printer models, and as such, the printer may communicate with many different categories of control panels. Moreover, as noted above, it is possible that control panels that are associated with different vendors (or associated with models from the same vendor) may be installed in printers belonging to the same or similar printer models. As such, a printer controller of a given printer may be constructed to determine a control panel identification (CPID) of the control panel that is installed in the printer, so that the printer controller may, based on the CPID, select and use the appropriate functions and/or protocols for communicating with the control panel.

The printer models may vary in price, and from the standpoint of using CPID detection for the lowest cost printer model, it may be beneficial for the CPID detection to have a minimal (if any) associated bill of materials (BOMs) and have a minimal impact (if any) on the complexity of the printer's firmware.

In accordance with example implementations that are described herein, the printer may have a control panel connector that is constructed to form mechanical and electrical connections with a mating connector of a control panel. For example, the printer may have a female-type connector with receptacles that receive corresponding pins of the control panel, or vice versa. Regardless of the specific connectors that are used, the connectors connect "signal lines" (also called "pins," "terminals," or "communication lines" herein) together so that the printer controller and the control panel may communicate over the signal lines.

In accordance with example implementations, the control panel may include resistors that are connected to the GPIO signal lines in a manner that forms a CPID for the control panel. In this manner, a given resistor may be connected to an associated GPIO signal line to either electrically couple the signal line to a relatively larger voltage (a positive supply voltage, for example) or a relatively smaller voltage (ground or a negative supply voltage, as examples) for purposes of forming a pin ID for the signal line. In this manner, in accordance with example implementations, the pin ID of a given signal line, or pin, of the control panel may be a single digit binary value, depending on whether a resistor electrically couples the pin to a positive supply voltage (forming a pin ID of "1," for example) or ground (forming a pin ID of "0," for example). In other words, the pin may be either pulled high (coupled to a positive supply voltage, for example) or pulled low (coupled to ground, for example). Therefore, the control panel may have a set of such pin IDs (one for each signal line, or pin, associated with the control panel connection, for example), and the pin IDs may collectively form the CPID for the control panel.

In accordance with example implementations, a given pin, or signal line, of the control panel may be coupled to a capacitor, which causes the signal line to exhibit a transient response that is a function of whether the signal line is pulled high or pulled low by a resistor. As described herein, in accordance with example implementations, the printer controller determines a given pin ID by driving the voltage of the associated pin, or signal line, to predetermined logic levels (i.e., by writing bits of "1" and "0" to the signal line) and observing the resulting transient responses of the signal line to these driven signals (i.e., reading bits represented by the voltage of the signal line at different times). The printer controller may then determine the pin ID based on the observed transient responses.

For example implementations that are described herein, the control panel connector connects to a general purpose input/output (GPIO) interface of the printer, such that each GPIO signal pin, or signal line, of the control panel has an associated pin ID. In accordance with example implementations, to determine the pin ID for a given GPIO pin, a controller of the printer may drive the GPIO pin with logic one and zero voltages and observe the corresponding transient responses of the GPIO pin. More specifically, in accordance with example implementations, the controller may write a logic one bit to a given GPIO signal line and then, read a pattern of time successive bits (two bits, for example) the signal line for purposes of observing the transient response of the pin to the written logic one bit. In a similar manner, the controller may drive the GPIO signal line with a logic zero bit and then, read a pattern of time successive bits (two bits, for example) from the signal line. As described herein, the printer controller may then, in accordance with example implementations, determine a pin ID based on the read two bit patterns.

In accordance with example implementations, a "transient response" of a GPIO pin, or signal line, refers to the natural response of the pin (the observed voltage of the pin, for example) due to storage element(s) that are coupled to the signal line and whether the pin is resistively coupled to a supply voltage or ground. For example, in accordance with example implementations, the resistance and capacitance that are coupled to a given signal line, along with whether the signal line is connected to a supply voltage or ground, influences the transient response of the signal line. Therefore, as described herein, by observing the transient response of a signal line, the pin ID for that signal line may be determined.

Referring to FIG. 1, as a more specific example, in accordance with some implementations, a printer 100 may include one or multiple processors 130, which form a controller for the printer 100 (i.e., form the "printer controller"). In this manner, the processor 130 may perform such functions as receiving user input relating to status inquiries, receiving user input to control set up of the printer 100; providing status information and error statuses; controlling a print engine 140 of the printer 100 (to print on media, for example); communicating with a host computer or other network device via one or multiple communication interfaces 160 of the printer 100; and so forth. To perform these operations, the processor 130 may, for example, access data and execute machine executable instructions (e.g., software, such as firmware) that is stored in a memory 150 of the printer 150. As an example, the memory 150 may be a non-transitory memory that is formed from semiconductor storage-based memory devices, memristors, phase change memory devices, and so forth, depending on the particular implementation. The memory 150 may be a volatile memory, a non-volatile memory or a combination of volatile and non-volatile memories, depending on the particular implementation.

Figure 5A:
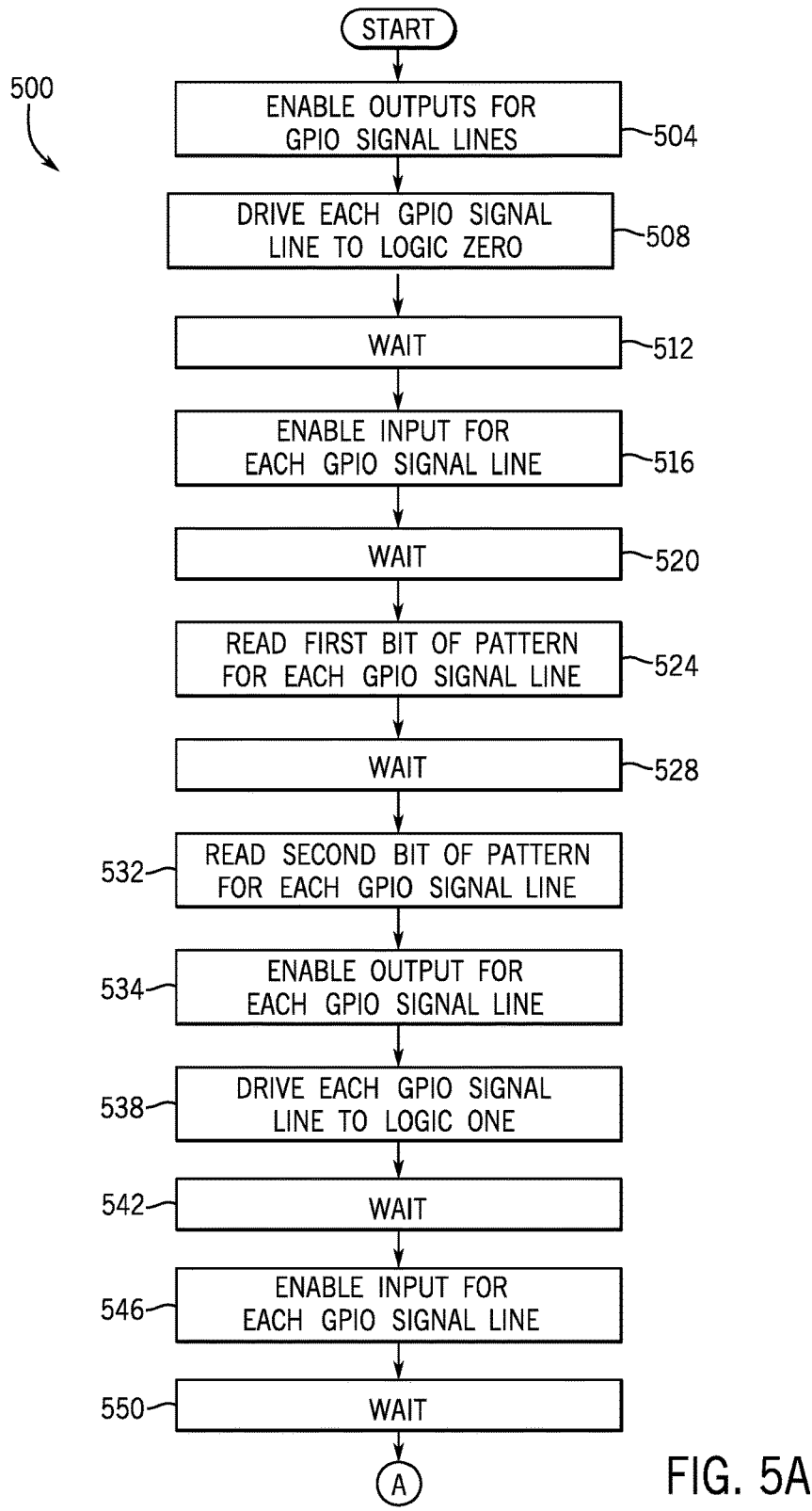
FIGS. 5A and 5B illustrate a technique to detect and identify a control panel of a printer according to an example implementation.
Figure 5B:
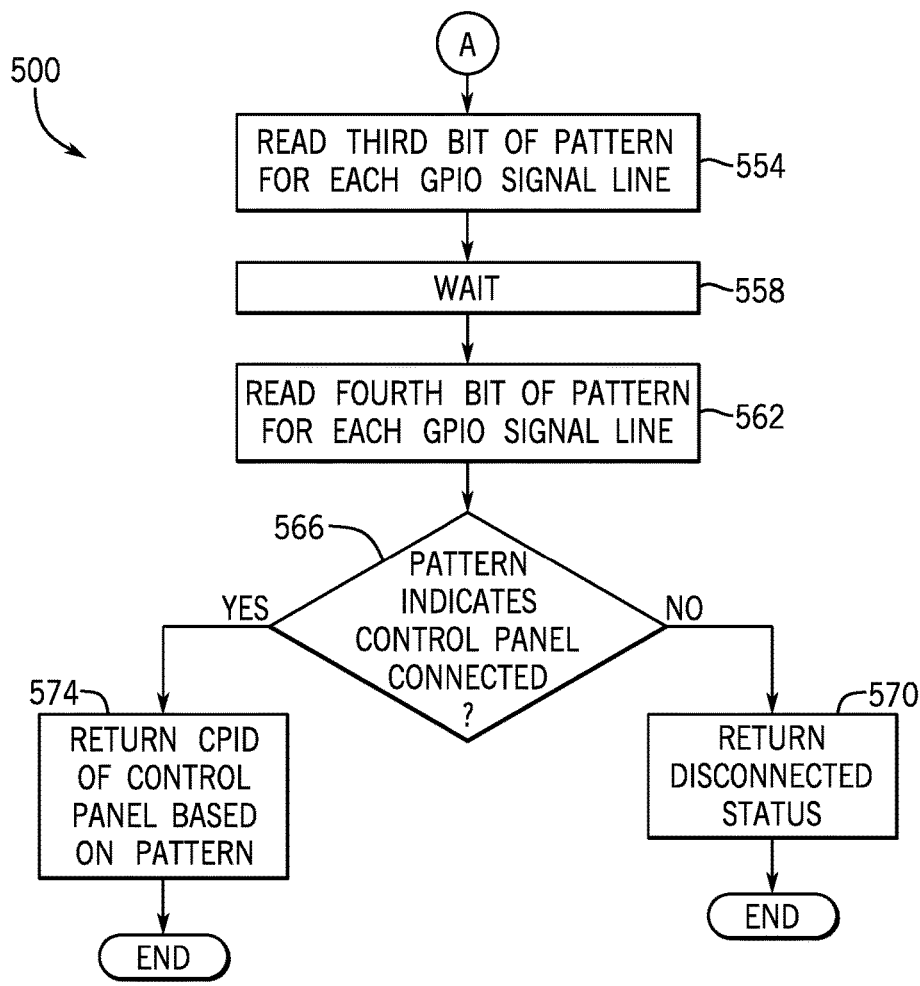

In accordance with example implementations, the processor 130 may be constructed to execute machine executable instructions (software or firmware) and may be formed from one or multiple microcontrollers, one or multiple CPUs, one or multiple CPU processing cores, and so forth. In accordance with further example implementations, the processor 130 may be a dedicated hardware circuit, such as one or multiple FPGAs, one or multiple ASICs, and so forth. Regardless of its particular form, in accordance with example implementations, the processor 130 may undertake actions to perform one or multiple techniques that are described herein, such as techniques 300 (FIG. 3), 400 (FIG. 4) or 500 (FIGS. 5A and 5B).

The processor 130 communicates with a control panel 110, in accordance with example implementations, through a GPIO interface 120. In this manner, the control panel 110 and the GPIO interface 120 are electrically coupled together when a connector (not shown) for the control panel 110 (a cable connector, for example) is connected to a mating connector (not shown) of the printer 100. The control panel 110 and the GPIO interface 120 communicate over associated GPIO signal lines 126. Each signal line 126 may either be driven with a signal for purposes of writing a bit (for the case in which the GPIO interface 120 outputs a bit on the signal line 126) or providing a signal (for the case in which the GPIO interface 120 receives a bit on the signal line 126) when the control panel 110 writes a bit to the signal line 126. In this manner, as depicted in FIG. 1, the GPIO interface 120 may include one or multiple transceivers 122, where each transceiver 122 communicates signals with a corresponding signal line 126.

In accordance with example implementations, each transceiver 122 contains a transmitter 123 and a receiver 125. In this regard, in accordance with example implementations, when the processor 130 writes a bit to a GPIO signal line 126, the corresponding transmitter 123 is enabled and the corresponding receiver 125 is disabled. When the processor 130 reads a bit from the GPIO signal line 126, the transmitter 123 is disabled, and the receiver 125 is enabled.

In accordance with example implementations, the control panel 110 includes one or multiple resistors 113, where each resistor 113 may be connected to a given GPIO signal line 126 in a manner that forms a pin ID for the GPIO signal line 126. For example, in accordance with example implementations, a resistor 113 may be coupled between the GPIO signal line 126 and a positive supply voltage to form one pin ID (a pin ID of "1," for example) or be coupled between the GPIO signal line 126 and ground to form another pin ID (a pin ID of "0," for example). The control panel 110, in accordance with example implementations, also includes capacitors 112, where each capacitor 112 is coupled to one of the signal lines 126. The process of determining the pin IDs, in accordance with example implementations, involves observing transient responses of the signal lines 126; and the transient response of a given signal line 126 is a function of the capacitance coupled to the signal line 126, the resistance of the resistor 113, and whether the resistor 113 is coupled to ground or to the positive supply voltage.

Figure 2:
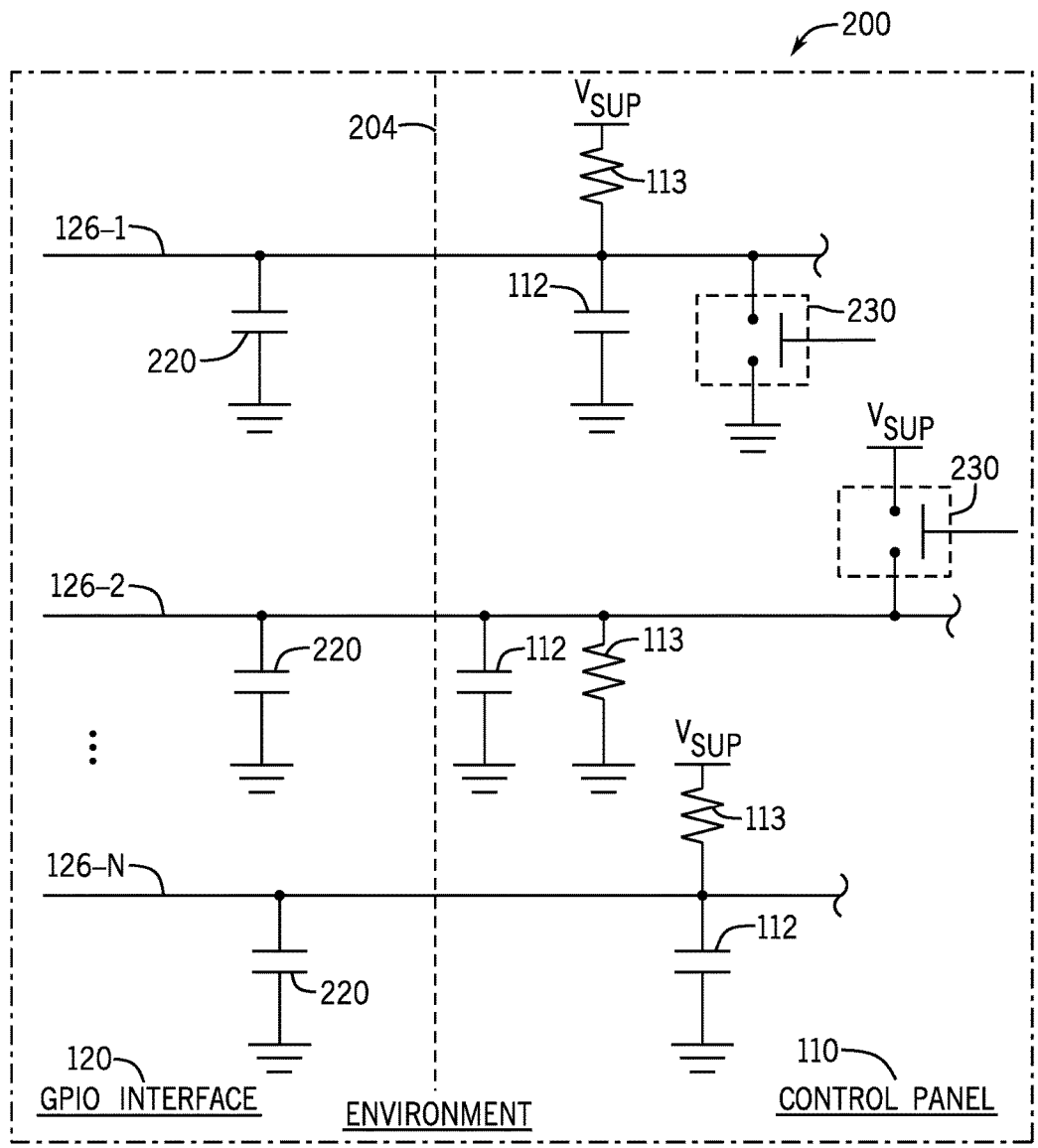
FIG. 2 is a schematic diagram of an environment of a printer illustrating a connection between a General Purpose Input/Output (GPIO) interface and a control panel according to an example implementation.

Referring to FIG. 2 in conjunction with FIG. 1, in accordance with some implementations, the connection between the GPIO interface 120 and control panel 110 may be represented by an environment 200. In this manner, a dashed line 204 represents a connection interface formed by a control panel connector (not shown) being electrically and mechanically connected to a mating connector of the printer 100. For example, the control panel 110 may have a communication cable that terminates in a control panel connector, and the control panel connector may be inserted into a mating connector of the printer 100. For this particular example, N GPIO signal lines 126-1 to 126-N have corresponding pin IDs that collectively form a CPID for the control panel 110. More specifically, for the example environment 200 of FIG. 2, a resistor 113 is coupled between the signal line 126-1 and a positive supply voltage (called "Vsup" in FIG. 2); a resistor 113 is coupled between the GPIO signal line 126-2 and ground; and resistor 113 is coupled between the signal line 126-N and the Vsup supply voltage. Thus, for the example environment 200 of FIG. 2, two different pin IDs are illustrated: a first pin ID (a pin ID of "0," for example) in which a resistor 113 is coupled between the pin and ground and a second pin ID (a pin ID of "1," for example) in which a resistor 113 is coupled between the pin and the supply voltage.

The transient response of the GPIO signal line 126 is a function of the connection that is made by its associated resistor 113, the resistance of the resistor 113, and the capacitance coupled to the signal line 126. In accordance with example implementations, the capacitance coupled to a given GPIO signal line 126 may include a capacitance of the associated capacitor 112 as the capacitance of a capacitor 220 that is located on the GPIO interface side of the connection 204, as illustrated in FIG. 2. In accordance with further example implementations, the control panel 110 may not include the capacitors 112.

In accordance with example implementations, the processor 130 may use the following pin ID detection technique. The pin ID detection technique involves the processor 130 writing a "0" to the GPIO signal line 126; reading bits from the signal line 126 representing a transient response of the signal line 126 to the writing of the "0" bit; writing a "1" to the signal line 126; reading bits from the signal line 126 representing a transient response of the signal line 126 to the writing of the "1" bit; and determining the pin ID based on the read bits.

Figure 7A:
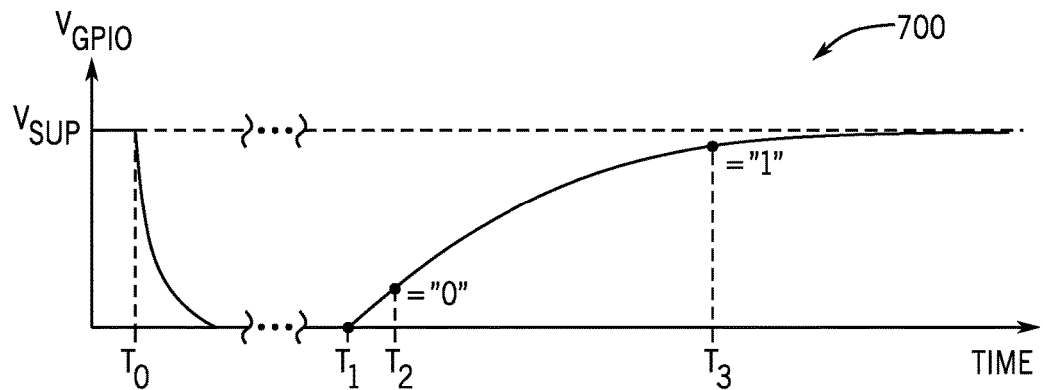
FIGS. 7A and 7B are voltage versus time waveforms illustrating responses exhibited by a GPIO signal line that is coupled to a pull up resistor in response to logic zero (FIG. 7A) and logic one (FIG. 7B) bits being written to the GPIO signal line according to an example implementation.

More specifically, in accordance with an example implementation, the processor 130, through the GPIO interface 120, may write a "0" bit to the GPIO signal line 126 and then subsequently read two bit values from the GPIO signal line 126 for purposes of determining the transient response of the GPIO signal line 126 to the writing of the "0" bit. FIG. 7A depicts an example response 700 of a GPIO voltage (called "$V_{GPIO}$" herein) in response to a bit of "0" being written to the GPIO signal line 126 for the case in which the resistor 113 is connected to the $V_{SUP}$ supply voltage.

In this manner, referring to FIG. 7A in conjunction with FIGS. 1 and 2, the $V_{GPIO}$ voltage is initially at the Vsup supply voltage due to the GPIO signal line 126 being pulled high by the resistor 113. At time $T_0$, the processor 130 causes a "0" bit to be written to the GPIO signal line 126, and the corresponding driving of the GPIO signal line 126 by the transmitter 123 with the "0" bit ceases at time $T_1$ for this example. As depicted in FIG. 7A, due to the resistor 113 pulling the GPIO signal line 126 to the $V_{SUP}$ supply voltage, the $V_{GPIO}$ voltage rises beginning at time $T_1$. At time $T_2$, the processor 130, using the receiver 125, reads the $V_{GPIO}$ voltage, and for this example, the $V_{GPIO}$ voltage corresponds to a bit of "0." The processor 130 then waits and reads the GPIO signal line 126 at a later time $T_3$ to read a bit of "1," as depicted in FIG. 7A. Thus, for the case in which the resistor 113 is a pull up resistor that couples the GPIO signal line 126 to the $V_{SUP}$ voltage and the processor 130 writes a "0" bit to the GPIO signal line 126, the processor 130 reads a bit pattern, or sequence, of "01b," where "b" represents a binary notation.

Figure 7B:
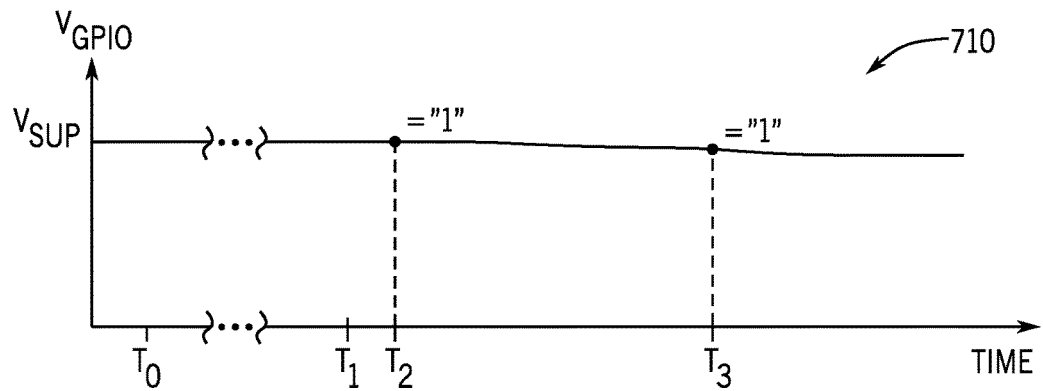

FIG. 7B depicts an illustration 710 for the next part of the pin ID detection technique in which the processor 130 drives the GPIO signal line 126 with a logic one voltage, i.e., writes a "1" bit to the GPIO signal line 126. Thus, referring to FIG. 7B in conjunction with FIGS. 1 and 2, at time $T_0$, the processor 130 writes a "1" bit, and at time $T_2$, the processor 130 reads a bit of "1" from the GPIO signal line 126. As depicted in FIG. 7B, the processor 130 delays and reads a bit of "1" at time $T_3$. In other words, because the resistor 113 couples the GPIO signal line 126 to the $V_{SUP}$ voltage, the $V_{GPIO}$ voltage does not change from time $T_0$ to time $T_3$.

Thus, for the case in which the resistor 113 is a pull up resistor that couples the GPIO signal line 126 to the $V_{SUP}$ voltage and the processor 130 writes a "1" bit to the GPIO signal line 126, the processor 130 reads a bit sequence of "11b." Concatenating the two binary results from the above-described two parts of the pin ID detection technique results in a time sequence, or pattern, of "01b"+"11b," or "0111b," which corresponds to a pin ID of "1" for the GPIO signal line 126. Thus, by writing bits to the GPIO signal line 126 and reading bits in response thereto, as described above, the processor 130 may detect, or determine, a pin ID of "1" for the GPIO signal line 126.

Figure 8A:
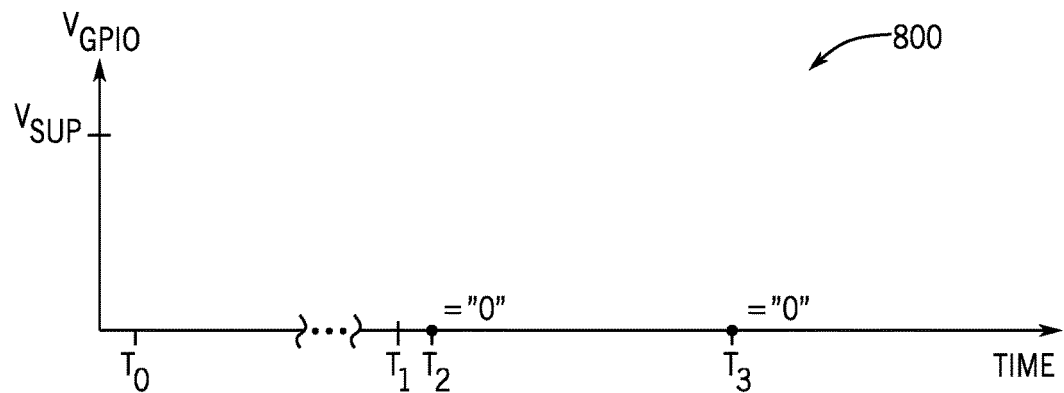
FIGS. 8A and 8B are voltage versus time waveforms illustrating responses exhibited by a GPIO signal line that is coupled to a pull down resistor in response to logic zero (FIG. 8A) and logic one (FIG. 8B) bits being written to the GPIO signal line according to an example implementation.
Figure 8B:
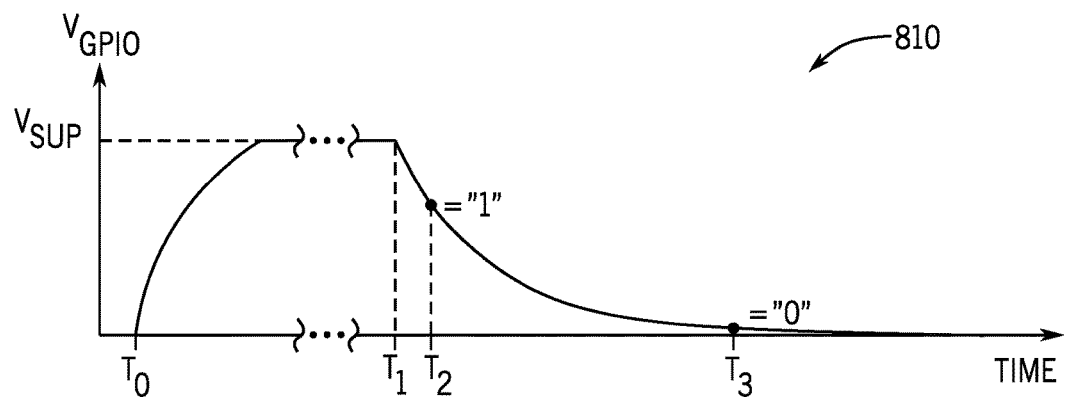

FIG. 8A and FIG. 8B illustrate pin ID detection when the resistor 113 is a pull down resistor that couples the GPIO signal line 126 to ground. More specifically, FIG. 8A depicts an example illustration 800 for the case in which the processor 130 writes a "0" bit to the GPIO signal line 126 beginning at time $T_0$ and ending at time $T_1$. Referring to FIG. 8A in conjunction with FIGS. 1 and 2, the $V_{GPIO}$ voltage is initially at ground due to the GPIO signal line 126 being pulled low by the resistor 113. The processor 130 reads a "0" bit at time $T_2$ and reads at "0" bit at time $T_3$, which corresponds to a bit time sequence, or pattern, of "00b." Referring to FIG. 8B in conjunction with FIGS. 1 and 2, the $V_{GPIO}$ voltage is initially at ground due to the GPIO signal line 126 being pulled low by the resistor 113. The processor 130 writes a "1" bit to the GPIO signal line 126 beginning at time $T_0$ and ending at time $T_1$, which cause the $V_{GPIO}$ voltage to rise to the $V_{SUP}$ supply voltage. At time $T_2$, the processor 130 reads a bit of "1." Due to the decay of the $V_{GPIO}$ voltage because of the pull down resistor 113, the processor 130 reads a bit of "0" at time $T_3$. Therefore, the corresponding bit pattern is "10b." Accordingly, when the resistor 113 couples the GPIO signal line 126 to ground, the processor 130 reads a bit pattern of "00b"+"10b," or "0010b," which corresponds to a pin ID of "0."

Thus, in accordance with example implementations, by applying the above-described pin ID detection technique, if a pull up resistor 113 is coupled to a GPIO signal line 126, the processor 130 reads a bit pattern of "0111b" (i.e., a bit pattern corresponding to a pin ID of "1") for the GPIO signal line 126; and if a pull down resistor is coupled to the GPIO signal line 126, the processor 130 reads a bit pattern of "0010b" (i.e., a bit pattern corresponding to a pin ID of "0") for the GPIO signal line 126.

In accordance with example implementations, the bit pattern that is read by the processor 130 in the pin ID detection technique may also indicate whether a control panel is connected. In this regard, in accordance with example implementations, if a control panel is not connected to the printer 100 (i.e., no control panel is connected to GPIO interface 120), then the processor 130 reads a bit pattern of "0011b." Referring to FIG. 2, in this manner, when no control panel is connected, then the capacitor 220 stores a bit of "0" when the processor 130 writes a "0" bit, and because no resistor 113 is connected to discharge the capacitor 220, the processor reads two successive bits of "0." In a similar manner, when no control panel is connected, then the capacitor 220 stores a bit of "1" when the processor 130 writes a "1" bit, and because no resistor 113 is connected to discharge the capacitor 220, the processor reads two successive bits of "1."

In accordance with example implementations, if a key of the control panel 110 is engaged while the pin ID is being detected by the processor 130, then the corresponding voltage of the signal line 126 (and the corresponding bits read by the processor 130) may be influenced by the operation of the key. For example, referring to FIG. 2, a key 230 may be connected between the GPIO signal line 126-1 and ground. Therefore, when the key 230 is engaged, or depressed, the key 230 causes a bit of "0" to be read from the GPIO signal line 126-1. This may potentially affect the pin ID determination. However, in accordance with example implementations, the pin ID detection technique may accommodate the scenario in which a key being depressed during the pin ID detection. More specifically, in accordance with example implementations, if the key 230 is depressed, or engaged, a GPIO signal line that is pulled high by the resistor 113 (such as the case for GPIO signal line 126-1) causes the processor 130 to read a bit pattern of "0000b." If the key 230 is pulled to ground by a resistor 113 (such as the case for GPIO signal line 126-2), then engagement of the key 230 during the pin ID detection results in a bit pattern of "1111b" being read by the processor 130. As such, the pin ID may be robustly detected by the processor 130, regardless of whether or not keys are depressed during the pin ID detection.

Thus, referring to FIG. 3, in accordance with example implementations, a technique 300 includes driving (block 304) a signal line of a control panel connector to produce a transient response represented by a signal that is provided by the signal line and using (block 308) the response to determine a characteristic of a control panel connection. Using the response may include sampling (block 312) the signal a plurality of times to acquire a time sequence of values of the signal and determining (block 314) the characteristic based on the time sequence of values. As examples, the characteristic may be a pin ID and/or a control panel connection status.

More specifically, in accordance with example implementations, a technique 400 that is depicted in FIG. 4 may include writing (block 404) a bit to an input/output (I/O) signal line that is associated with a control panel; and in response to the writing, reading (block 408) bits from the I/O signal line at different times. The read bits are associated with a transient response to the I/O signal line. The technique 400 includes, based on the read bits, providing (block 412) a control panel identification result.

FIGS. 5A and 5B depict a technique 500 for determining whether a control panel is connected to a printer, and if so, determining the pin IDs for a set of GPIO pins for correspondingly determining the CPID of the control panel. More specifically, referring to FIG. 5A, pursuant to the technique 500, the technique 500 includes enabling (block 504) outputs for the GPIO signal lines, i.e., allowing the processor 130 to write to the GPIO signal lines. Next, pursuant to block 508, the processor 130 may drive each of the GPIO signal lines to a logic "0" state, i.e., write a "0" bit to each of the GPIO signal lines. Pursuant to block 512, the processor 130 may then wait for a predetermined time interval (5 microseconds, for example) before enabling inputs for each of the GPIO signal lines, pursuant to block 516. In this regard, by enabling the inputs, the processor 130 may then read bits for the GPIO signal lines. Before reading the signal lines, however, the processor 130 may wait (block 520), such as, wait, for example, for an interval of 5 microseconds before reading (block 524) the first bit. The processor 130 may then wait (block 528) for another predetermined time interval (a longer time interval such as 1500 microseconds, for example). The technique 500 next includes reading (block 532) the second bit of the pattern for each GPIO signal line. Thus, at this point, the processor 130 has determined the first two bits of the bit patterns for each of the GPIO pins that are used to determine corresponding CPID.

Next, the processor 130 prepares to read the next two bits. In this regard, the processor 130 enables (block 534) the output for each GPIO signal line and drives (block 538) each GPIO signal line to a logic 1, i.e., writes a bit of "1" to the respective GPIO signal lines. The processor 130 then waits (block 542), such as a period of 5 microseconds, before enabling (block 546) the input for each GPIO signal line. The processor 130 may then wait (block 550), such as waiting for a period of 5 microseconds, before reading (block 554 of FIG. 5B) the third bit of the pattern for each GPIO signal line. Subsequently, the processor 130 may wait (block 558) for a longer time period, such as a time period of 1500 microseconds before reading (block 562) the fourth bit of the pattern. Thus, at this point, the processor 130 has the four bit pattern for each of the GPIO signal lines. Based on these values, the processor 130 may determine (decision block 566) whether a control panel is connected and if disconnected, the technique 500 may return (block 570) a disconnected status. Otherwise, if a control panel is connected, the technique 500 includes returning (block 574) the CPID of the control panel.

Figure 6:
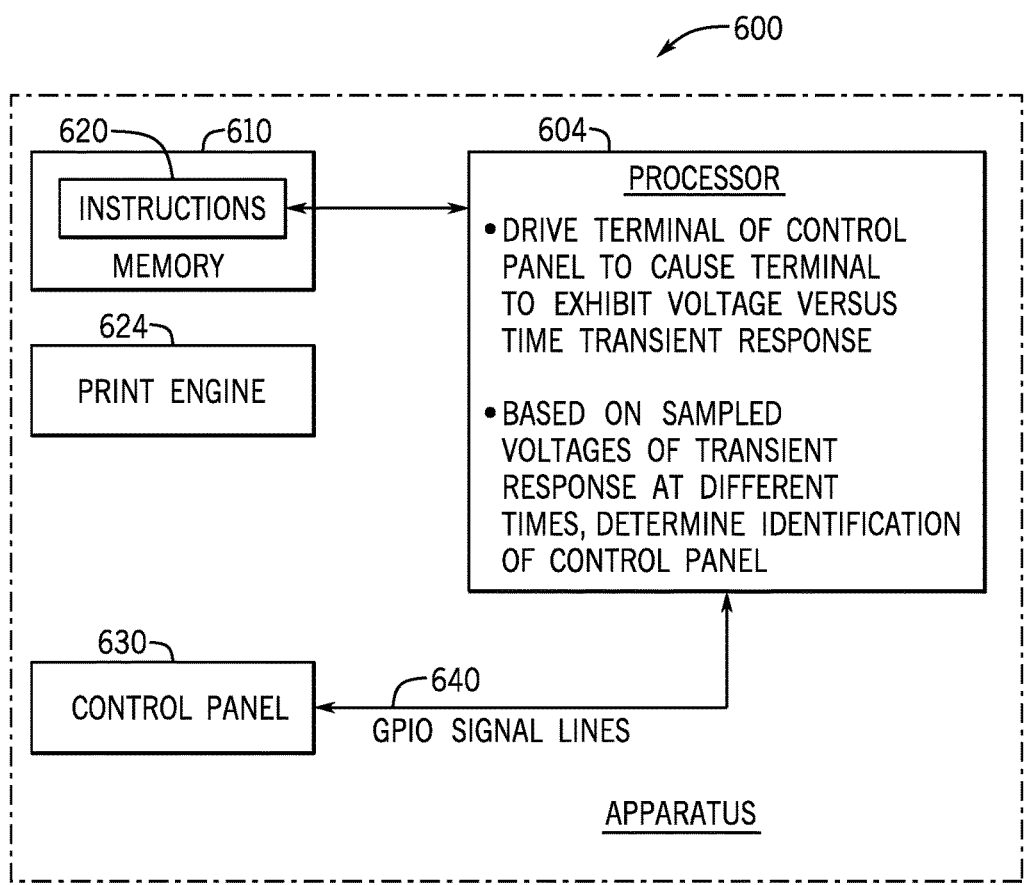
FIG. 6 is a schematic diagram of an apparatus to identify a control panel of a printer according to an example implementation.

Referring to FIG. 6, thus, in accordance with example implementations, an apparatus 600 may include a print engine 624; a control panel 630 including a communication terminal 640; a processor 604 and a memory 610. The memory may store instructions 620 that add, when executed by the processor 604, may cause the processor 610 to drive the communication terminal 640 to cause the communication terminal to exhibit a voltage versus transient response;

and based on sampled voltages of the transient response at different times, determine an identification of the control panel 630.

Other implementations are contemplated, which are within the scope of the appended claims. For example, as described above, when a control panel is not connected to the printer, a bit pattern of "0011b" may be detected for each of the GPIO signal lines 126. The bit pattern of "0011b" may also be detected for an unconnected GPIO pin (in other words, a pin of a connector that connects a control panel to the printer) for an otherwise connected control panel. In this manner, some control panels may use a full set of GPIO pins (five GPIO pins, for example), and other control panels may use a subset of the full set (three GPIO pins with two GPIO pins being unused, or disconnected, for example). Thus, there may be some GPIO pins or GPIO signal lines 126 that are not used when a given control panel 110 is connected to the GPIO interface 120. The CPID detection technique, in accordance with example implementations, accommodates this scenario. For example, the CPID detection technique may, when a particular control panel 110 is connected, determine a pin ID for three GPIO pins (i.e., for three GPIO signal lines 126) and determine that two GPIO pins (i.e., two GPIO signal lines 126) are disconnected. In this manner, a corresponding CPID of three pin IDs (instead of a full set of five pin IDs, for example) may be expected when this particular control panel is connected. As such, the detection of unconnected GPIO pins may aid in identifying a connected control panel.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A method comprising:
    driving a signal line of a control panel connector to produce a transient response of the signal line in response to the driving of the signal line, wherein the transient response of the signal line is represented by a signal provided by the signal line; and
    using the transient response to determine a characteristic of a control panel connection, wherein using the transient response comprises:
        writing a first bit to the signal line;
        in response to the writing of the first bit, reading at least one second bit from the signal line;
        writing a third bit to the signal line;
        in response to the writing of the third bit, reading at least one fourth bit from the signal line; and
        determining the characteristic based on the at least one second bit and the at least one fourth bit.

2. The method of claim 1, wherein:
    the characteristic comprises a control panel identification (ID) bit value;
    sampling the signal comprises reading a time sequence of bits; and
    determining the characteristic comprises associating the read bit sequence with the control panel ID bit value.

3. The method of claim 1, wherein:
    the characteristic comprises a status representing no control panel being connected to the control panel connection; and
    sampling the signal comprises reading a time sequence of bits; and
    determining the characteristic comprises determining that no control panel is connected based on recognition of the time sequence of bits.

4. The method of claim 1, wherein driving the signal line comprises driving the signal line to produce a first transient response represented by a first signal provided by the signal line, the method further comprising:
    driving the signal line to produce a second transient response represented by a second signal of the signal line;
    sampling the second signal a plurality of times to acquire a time sequence of values of the second signal; and
    further basing determination of the characteristic based on the time sequence of values of the second signal.

5. The method of claim 4, wherein:
    driving the signal line to produce the first transient response comprises driving the signal line with a logic one signal; and
    driving the signal line to produce the second transient response comprises driving the signal line with a logic zero signal.

6. The method of claim 4, wherein:
    driving the signal line to produce the first transient response comprises driving the signal line with a logic zero signal; and
    driving the signal line to produce the second transient response comprises driving the signal line with a logic one signal.

7. The method of claim 1, wherein the signal line is one of a plurality of signal lines, the method further comprising:
    driving the plurality of signal lines; and
    further basing determination of the characteristic based on a result of driving the plurality of signal lines.

8. An article comprising a non-transitory computer readable storage medium storing instructions that, when executed by a computer, cause the computer to:
    write a first bit to an input/output (I/O) signal line associated with a control panel, wherein the writing of the first bit causes a transient response of the I/O signal line;
    in response to the writing of the first bit, read a plurality of second bits from the I/O signal line at different times, wherein the read plurality of second bits comprise samples of the transient response at the different times;
    write a third bit to the input/output (I/O) signal line associated with the control panel, wherein the writing of the third bit causes a transient response of the I/O signal line;
    in response to the writing of the third bit, read a plurality of fourth bits from the I/O signal line at different times, wherein the read plurality of fourth bits comprise samples of the transient response at the different times; and
    based on the read plurality of second bits and the read plurality of fourth bits, provide a control panel identification result.

9. The article of claim 8, wherein the storage medium stores instructions that when executed by the computer cause the computer to:
    determine whether a key of the control panel is engaged based on the read bits.

10. The article of claim 8, wherein the storage medium stores instructions that, when executed by the computer, cause the computer to determine whether the control panel is connected to the signal line.

11. The article of claim 8, wherein the signal line is one of a plurality of signal lines associated with the control panel, and the storage medium stores instructions that, when executed by the computer, cause the computer to write bits to other I/O signal lines associated with a control panel;

in response to the writing, read bits from each of the other I/O signal lines at different times, wherein the bits read from each I/O signal line of the other I/O signal lines are associated with a transient response of the I/O signal line;

further base the control panel identification result based on the bits read from the other I/O signal lines.

12. An apparatus comprising:

a print engine;

a control panel comprising a communication terminal;

a processor; and a memory to store instructions that, when executed by the processor, cause the processor to:

drive the communication terminal to cause the communication terminal to exhibit a voltage versus transient response in response to the driving of the communication terminal; and based on sampled voltages of the transient response at different times, determine an identification of the control panel, wherein the transient response comprises:

a first transient response comprising at least one first plurality of bits read at a first time and a second transient response comprising at least one second plurality of bits read at a second time.

13. The apparatus of claim 12, further comprising:

a transmitter coupled to the communication terminal; and a receiver coupled to the communication terminal, wherein the instructions, when executed by the processor, cause the processor to enable the transmitter to drive the communication terminal, and the instructions, when executed by the processor, cause the processor to disable the transmitter and enable the receiver to sample the voltages.

14. The apparatus of claim 12, wherein the control panel comprises a resistor coupled to a supply voltage or ground to form an identification bit associated with the terminal.

15. The apparatus of claim 12, further comprising a capacitor connected between the communication terminal and ground.

* * * * *

UNITED STATES PATENT AND TRADEMARK OFFICE
CERTIFICATE OF CORRECTION

PATENT NO. : 10,298,791 B2
APPLICATION NO. : 15/596633
DATED : May 21, 2019
INVENTOR(S) : Guangyu Zhou Page 1 of 1

It is certified that error appears in the above-identified patent and that said Letters Patent is hereby corrected as shown below:

On the Title Page

In Column 1, item (73), Assignee, Line 2, delete "L. P.," and insert -- L.P., --, therefor.

Signed and Sealed this
Twenty-sixth Day of November, 2019

Andrei Iancu
*Director of the United States Patent and Trademark Office*